(12) United States Patent
Barrick et al.

(10) Patent No.: US 8,012,912 B1
(45) Date of Patent: Sep. 6, 2011

(54) METHOD OF INCREASING THE YIELD OF SUGAR FROM SUGARCANE

(75) Inventors: Bret S. Barrick, Baton Rouge, LA (US); Dirk W. Franklin, Beaumont, TX (US)

(73) Assignee: Bret Barrick, Baton Rouge, LA (US)

( * ) Notice: Subject to any disclaimer, the term of this patent is extended or adjusted under 35 U.S.C. 154(b) by 162 days.

(21) Appl. No.: 11/904,704

(22) Filed: Sep. 28, 2007

(51) Int. Cl.
*A01N 57/00* (2006.01)
(52) U.S. Cl. ................................................. 504/165
(58) Field of Classification Search .................. 504/165
See application file for complete search history.

(56) References Cited

U.S. PATENT DOCUMENTS

| | | | | |
|---|---|---|---|---|
| 4,404,012 A | * | 9/1983 | Orwick et al. | 504/253 |
| 2002/0103083 A1 | * | 8/2002 | Harman | 504/117 |

OTHER PUBLICATIONS

Dusky, J.A., Response of Eight Sugarcane Cultivars to Glyphosine and Glyphosate Ripeners, 1986, Springer-Verlag, Journal of Plant Growth Regulation 4:225-235.*
Vidal, I., Nitrogen uptake and chlorophyll meter measurements in Spring Wheat, 1999, Kluwer Academic Publishers, Nutrient Cycling in Agroecosystems, 55:1-6.*
BA Keating, G. Kingston, RC Muchow, AW Wood and MA Smith, A monitoring system based on amino-N at harvest time to improve nitrogen management in sugarcane systems, Australian Agronomy Conterence, Australian Society of Agronomy, 2001. www.regional.org.au.
Phan Gia Tan, Effect on production of sugar cane and on soil fertility of leafing the dead leaves on the soil or removing them, Livestock Research for Rural Development, Dec. 1995, vol. 7, No. 2, www.cipav.org.co.
Test for Sugar Content of Sugar Cane Utilizing MicroSoil, www.microsoil.com/TestResults/sugarcane.htm, Biomassters Inc.
Nguyen Thi Mui, Thomas R. Preson,& Ingvar Ohlsson, Responses of four varieties of sugar cane to planting distance and mulching, Livestock Research for Rural Development, 1997, vol. 9, No. 3, www.cipav.org.co.
RA Yates, Studies on the irrigation of sugar-cane, Australian Journal of Agricultural Research, CSIRO Publishing, 1967.
"Sugarcane", Wikipedia, the free encyclopedia, Jul. 10, 2007,http://en.wikipeia.org/wiki/Sugarcane.

* cited by examiner

*Primary Examiner* — Fereydoun G Sajjadi
*Assistant Examiner* — Danielle Sullivan

(57) ABSTRACT

A method of increasing the recoverable sugar content in sugarcane. The method comprises an efficient nitrogen fertilization practice, and a monitoring system to allow assessment of the nitrogen status of the sugarcane plant, to more effectively predict maturation of sugarcane for applying a ripener prior to harvest.

10 Claims, 2 Drawing Sheets

FIGURE 1

| SPAD READING | Nitrogen Remaining in Plant | Rate of Ripener Applied (oz/acre) |
|---|---|---|
| Greater than about 45 | Category 1 - Highest | 0 (allow vegetative growth here) |
| Between about 44 and about 45 | Category 2 - High | About 6 to about 7 |
| Between about 40 and about 43 | Category 3 - Medium | About 5.3 to about 5.7 |
| Between about 37 and about 39 | Category 4 - Low | About 4.8 to about 5.2 |
| Lower than about 37 | Category 5 - Minimal | About 4.0 to about 4.5 |

METHOD OF INCREASING THE YIELD OF SUGAR FROM SUGARCANE

BACKGROUND OF THE INVENTION

1. Field of the Invention

This invention relates to the sugarcane industry in general and to a method for increasing the recoverable sugar in sugarcane, in particular.

2. Prior Art

Due to limited global food and land resources, there have been ongoing efforts on the part of researchers and farmers to increase the yield of food-bearing plants, such as sugarcane. Sugarcane (*Saccharum*) is a tall perennial grass comprising stout fibrous stalks that are rich in sugar. However, consensus has not been reached in the sugarcane industry on how exactly to optimize the recoverable sugar yield in sugarcane. Various potential methods have been proposed and are commonly used in the sugarcane industry, though they have resulted in only limited success. One such method includes supplying great amounts of nitrogen to the soil at the beginning of growing season, to avoid the risk of insufficient nitrogen while the cane is growing. However, this method is costly and often counterproductive, as will be discussed further below. Another method includes applying chemical ripeners to the sugarcane plant prior to harvest. However, current application of ripeners are broad and unrelated to any specific measures, and thus are of limited effectiveness.

OBJECTS OF THE INVENTION

It is an object of this invention to provide a method for increasing the recoverable sugar content contained in sugar cane.

It is another object of this invention to provide an effective and economical nitrogen fertilization practice that achieves cost savings.

It is another object of this invention to provide a monitoring system that that would enable growers to assess the nitrogen status of sugarcane plants, so as to more effectively apply a ripener prior to harvesting, as well as to determine the initiation of harvest.

These and other objects of the invention shall become apparent from the ensuing figures and descriptions of the invention.

SUMMARY OF THE INVENTION

A method of increasing the recoverable sugar content in sugarcane is disclosed. The method comprises introducing a low and effective amount of nitrogen to the soil prior to the sugarcane growing season; monitoring the nitrogen concentration in the leaves of the sugarcane plant from the middle of the growing season through the final stages of harvest to obtain specific measures of nitrogen depletion levels during this period; and applying an effective amount of a ripener to the leaves of the sugarcane plant, based on the specific measures of plant nitrogen levels.

BRIEF DESCRIPTION OF THE FIGURES

FIG. 1 illustrates a preferred correlation between SPAD readings, nitrogen depletion levels in sugarcane plant leaves, and rates of ripener application.

DETAILED DESCRIPTION OF THE INVENTION

Figure 2:
FIG. 2 illustrates blocks in a test field in which an experiment was conducted to ascertain the preferred amounts of nitrogen to supply at the beginning of the growing season, and to establish categories of nitrogen depletion levels utilizing SPAD readings.
Figure 2:

The invention proposes an improved method for increasing the commercially recoverable sugar content of sugar cane, principally sucrose. In a preferred embodiment, the method of the present invention is utilized in regions appropriate for sugarcane cultivation i.e. generally regions having a tropical or subtropical climate, with an adequate amount of annual moisture. Prime growing regions around the world include Brazil, Colombia, Peru and Cuba. In the United States, the majority of sugarcane production occurs in Florida, Texas, and Louisiana.

The first step of the method of the present invention includes an efficient and economical nitrogen fertilization practice. In sugarcane cultivation, the sugarcane plant is propogated either from seeds or stem cuttings of a sugarcane stalk including one or more buds. Once these seeds or cuttings have been planted into the soil to establish what is known as a plant crop, a stand of cane can be harvested several times such that after each harvest the cane will propogate a new stalk or what is known as a ratoon crop. Each successive harvest of a ratoon crop will generate a smaller yield until replanting is warranted. In regions of the United States where sugarcane is cultivated, the initial planting is generally done in the fall. Subsequently, there is a period of dormancy lasting through the winter, until the following spring when growing season begins. The crop is then harvested in the autumn to avoid the first freeze. In the United States, the time between growing season and the final stages of harvest of a plant or ratoon crop is generally between about 6 months to about 8 months. Prior to the beginning of growing season, and as discussed above, it has become common practice to supply great amounts of nitrogen to the soil of a ratoon crop or a plant crop in an attempt to optimize the growth of the plant and to increase sugar yield during harvest. However, this prior art fertilization practice is wasteful and counterproductive. Providing excessive amounts of nitrogen to the soil is believed to cause excessive uptake of nitrogen such that the plant becomes saturated. As a result, the growing phase of the plant is prolonged. When normal harvesting time arrives, the plant is not matured, but still in a vigorous vegetative state, using up its sugars for metabolism. This often leads to a premature harvesting of the sugarcane plant, with a decreased sugar yield.

It is believed that excessive vegetative growth of the sugarcane plant near harvest time can be prevented by limiting nitrogen availability at the beginning of the growing season. Accordingly, the method of the present invention proposes an efficient and economical fertilization practice wherein nitrogen is introduced to the soil of a plant or ratoon crop in a low and effective amount at the beginning of the growing season. The nitrogen applied to the soil should be in amount sufficient to meet the growing needs of the plant during the projected duration of the growing season. However, the amount supplied should be limited so that the depletion of the nitrogen in the plant, and the plant's reaching of maturity, should coincide with the end of the growing season and the onset of the projected harvesting season. In a preferred embodiment, the nitrogen supplied is preferably in an amount between about 80 pounds/acre and about 120 pounds/acre, more preferably in an amount between about 80 pounds/acre and about 100 pounds/acre. See Examples 1 and 2 below.

A monitoring system to allow assessment of the nitrogen status of the sugarcane plant, so as to more effectively apply a ripener is also contemplated. As discussed previously, ripeners are commonly utilized in the prior art to increase the sugar yield of sugarcane. These ripeners work best when the plant is in its mature stages, such that the ripeners inhibit the residual vegetative growth and the plant's use of sugars for same. However, current application of ripeners are broad and unrelated to any specific measures, generally being applied to the plant in random amounts prior to harvest, based on the projected harvest schedule and/or a visual estimation of plant growth and maturity. As a result of these imprecise methods, the ripeners are often applied to the sugarcane plant when the plant is not in its optimal mature stage, but still in its active vegetative state. In this scenario, the ripeners are of limited effectiveness because the ripener cannot control excessive vegetative growth nor inhibit the plant from using its sugars for growth. Furthermore, as discussed above, if an excessive amount of nitrogen is introduced into the soil prior to growing season, as is commonly done in the prior art, then this further reduces the chances of successive ripener application, as the plant will be saturated with nitrogen and have a prolonged growing phase such that it will definitely not be in it optimal stages of maturity at the onset of the projected harvesting season.

Accordingly, the present invention proposes a more effective and specific method of ripener application based on a monitoring of the nitrogen concentration in the leaves of the sugarcane plant. In a preferred embodiment, various plots in a field of sugarcane are monitored beginning from approximately the middle of the growing season to the end of the harvesting season, to determine specific measures of nitrogen concentrations. This allows for the determination of which plot has the lowest nitrogen concentration (highest nitrogen depletion level) and accordingly is the most mature in the entire field. This plot will be treated first with the ripener and will also be harvested before the other plots in the field. To begin treatment of this plot, the nitrogen concentrations within the plot are measured again to determine crop maturity levels within the plot itself. Once these specific measures of nitrogen levels are obtained, they are then correlated to the timing and rate of ripener application. See Example 1 below and FIG. 1. Specifically, there is a negative correlation between the timing and rate of ripener application and the nitrogen depletion levels. More specifically, a lower nitrogen concentration in the plant, i.e. a higher nitrogen depletion level, will warrant lower ripener rates because the crop has reached its mature stages and accordingly, a great amount of ripener is not necessary to slow down the residual growing activity. On the other hand, a higher nitrogen concentration in the crop, i.e. lower nitrogen depletion levels, will warrant higher ripener rates. This is because the plant is still in a vegetative state and thus a greater amount of ripener will be necessary to control the growth of the plant, although, as mentioned above, the ripener will have limited effectiveness if the plant is in a very active growing phase. In this fashion, the monitoring system of the present invention allows for greater certainty as to when the plant is in its mature stages, and therefore receptive to the ripener, based on specific measures of declining nitrogen levels. Once applied, the ripener will be given about 30 to 40 days to work, and the crops in the plot will then be harvested. The remaining plots in the field will be monitored again to determine the next plot that is most mature. This plot will be treated with the ripener and harvested, in the identical fashion discussed above. The process will be repeated until all the plots in the field have been harvested by the end of the harvest season.

In a preferred embodiment, the plant nitrogen levels are measured using a standard commercially available chlorophyll meter such as SPAD-502, whereby higher chlorophyll readings signify a greater amount of nitrogen remaining in the plant and vice versa. In a further preferred embodiment, the ripener utilized is Roundup WeatherMax®, having glyphosate compound, a proven chemical ripener agent. FIG. 1 presents a preferred correlation between SPAD readings, plant nitrogen concentrations, and rate of ripener application, as established by the inventor. As indicated by FIG. 1, a SPAD reading greater than about 45 would signify that the nitrogen remaining in the plant is very high, and that accordingly the plant is still in an highly active vegetative state. In this scenario, no ripener would be applied at this point, as it would have little to no effect upon the plant. After several days, the plant can be monitored again, and a suitable application of the ripener could then be administered. As further indicated by FIG. 1, a SPAD reading between about 44 and about 45 would indicate that the plant is still in a vegetative state, however application of the ripener at a high rate, between about 6 ounces/acre to about 7 ounces/acre would be effective. In a preferred embodiment, a rate of ripener application that is higher than about 7 ounces/acre should be avoided, as such a high rate of application can damage the plant. A SPAD reading falling between about 40 to about 43 would signify that the nitrogen remaining in the plant is at a medium level. In this scenario, the rate of ripener application would preferably be between about 5.3 ounces/acre to about 5.7 ounces/acre. A SPAD reading between about 37 and about 39 would signify that the nitrogen remaining in the plant is low. In this scenario, the rate of ripener application would be low, between about 4.8 ounces/acre to about 5.2 ounces/acre. Finally, a SPAD reading below about 37, would signify that the nitrogen levels in the plant are at a minimum, and the rate of ripener application would be between about 4.0 ounces/acre to about 4.5 ounces/acre.

It should be noted that the plant nitrogen levels can also be monitored via alternative methods, whereby the measurements obtained as a result of any one of these methods could then be correlated to the SPAD readings above. Other feasible and effective methods via which sugarcane plant nitrogen levels can be determined include aerial imagery, tissue samples, sap readings, infrared imagery, satellite imagery, etc. It should further be noted that other suitable ripeners for application to the sugarcane plant may also be utilized, as long as they are capable of effectively inhibiting plant growth to allow accumulation of sugars. Specifically, ripeners with glyphosate compound are preferred as this is a proven chemical ripener agent. Other preferred examples of suitable ripeners include Polado® and Touchdown®.

In summary, the present invention proposes a two-part method for increasing the sugar content of sugarcane such that there is maximum sugar yield at harvest. The first part comprises an efficient and economical nitrogen fertilization practice wherein a low and effective amount of nitrogen is introduced to the soil prior to growing season, such that 1.) the sugarcane plant has sufficient nitrogen to meet its growing needs during the projected duration of the growing season, yet, 2.) toward the onset of the projected harvesting season, the nitrogen in the plant begins to deplete such that the plant is now in its mature stages, as opposed to being in an actively growing phase. The second part of the invention comprises actually monitoring the nitrogen depletion levels in the plant leaves from the middle of the growing season to the end of the harvesting season to obtain specific measurements that allow for verification of plant maturity. These specific measurements are then correlated to the timing and rate of ripener application to allow the ripener to have maximum effectiveness such that the plant accumulates the maximum amount of sugar, upon harvest time.

It should be noted that the method of the present invention, although practiced in the context of *Saccharum officinale*, the main variety of sugarcane cultivated in the U.S., may also be applicable to other varieties/species of sugarcane.

The preferred embodiments of the present invention are further described by reference to the following examples. The examples are offered by way of illustration and are not intended to limit the invention in any manner.

Example 1

Methodology

The inventor conducted an experiment on an established field of ratoon crop in St. James, La. The field comprised the *Saccharum officinale* (LCP 85-384) variety of sugarcane. The field was divided into 4 plots. See FIG. 2. Each of the 4 plots were then further separated into 5 subplots, each being 1.5 acres, such that the entire field was divided into a total of 20 subplots. Each of the 20 subplots were provided with known and varying amounts of nitrogen at the beginning of the growing season in early April. Specifically, 40, 80, 120, 160, or 200 pounds/acre of nitrogen fertilizer were provided to each subplot at the beginning of the growing season. During the growing season, all other variables on the subplots were kept constant. Toward the onset of harvest, in late September, the inventor monitored the nitrogen leaf concentrations in all the subplots utilizing a SPAD-502 chlorophyll meter, whereby higher chlorophyll readings signified a greater amount of nitrogen remaining in the plant and vice versa. Each subplot was monitored at both ends such that 2 SPAD readings were obtained from each subplot.

Results

As indicated by FIG. 2, the SPAD readings were higher in the subplots provided with greater amounts of nitrogen at the beginning of the growing season, while the SPAD readings were lower in the subplots provided with lower amounts of nitrogen at the beginning of the growing season. The results are significant because they show that there is a greater depletion in nitrogen in the plant toward the onset of harvest, when a lower amount of nitrogen has been provided to the soil at the beginning of the growing season. More specifically, it was determined that when the nitrogen supplied at the beginning of growing season was in an amount between about 80 pounds/acre and about 100 pounds/acre, there was a greater depletion in nitrogen toward the onset of harvest. As discussed above, it is desirable to have such a result because when the plant is in its mature stages toward the onset of harvest, it will be more receptive to the ripener such that its sugar content will be maximized.

The inventor further used the data to establish a correlation between the SPAD readings and the levels of nitrogen remaining in the plant toward the onset of harvest. More specifically, the inventor utilized the SPAD readings to establish the following five categories of nitrogen concentrations. See below: See also FIG. 1.

Category 1—Highest Concentration of Nitrogen Remaining in Plant

It was determined that a SPAD reading greater than about 45 would signify that the nitrogen remaining in the plant is very high, and that accordingly the plant is still in a highly active vegetative state.

Category 2—High Concentration of Nitrogen Remaining in Plant

It was determined that a SPAD reading that is between about 44 and about 45 would indicate that the nitrogen remaining in the plant is still high.

Category 3—Medium Concentration of Nitrogen Remaining in Plant

It was determined that a SPAD reading falling between about 40 to about 43 would signify that the nitrogen remaining in the plant is at a medium level.

Category 4—Low Concentration of Nitrogen Remaining in Plant

It was determined that a SPAD reading between about 37 to about 39 would signify that the nitrogen remaining in the plant is low.

Category 5-Minimal Concentration of Nitrogen Remaining in Plant

Finally, it was determined that a SPAD reading below about 37, would signify that the nitrogen levels in the plant are at a minimum.

In various subsequent experiments, the inventor further determined the rate of ripener application that would be most effective for each of these categories of nitrogen concentrations, so as to maximize the sugar yield at harvest. Specifically, the inventor determined that when the nitrogen concentration fell into Category 1, no ripener would be applied as the plant would still be in a vigorous growing phase and accordingly would not be receptive to the ripener. When the nitrogen concentration fell into Category 2, a preferred ripener application of approximately 6-7 ounces/acre would be applied. When the nitrogen concentration fell into Category 3, a preferred ripener application of approximately 5.3-5.7 ounces/acre would be applied. When the nitrogen concentration fell into Category 4, a preferred ripener application of approximately 4.8-5.2 ounces/acre would be applied. When the nitrogen concentration fell into Category 5, the rate of ripener application would be between about 4.0 to about 4.5 ounces/acre. FIG. 1 presents a preferred correlation between SPAD readings, plant nitrogen categories, and rate of ripener application In various subsequent experiments, the inventor applied the methodology of his invention to various fields of sugarcane. It was discovered that there was a significant increase in sugar yield in the fields that were treated with the methodology of the present invention vs. untreated fields. On an average, the treated fields had approximately 8.5 to approximately 9 pounds more sucrose per tone cane than the untreated fields, i.e. there was approximately an 5-7 percent increase in the recovery of commercial sugar.

While the invention has been described in terms of its preferred embodiment, other embodiments will be apparent to those of skill in the art from a review of the foregoing. Those embodiments as well as the preferred embodiments are intended to be encompassed by the scope and spirit of the following claims.

We claim:

1. A method for increasing the yield of sugar from a sugarcane crop during a period of time including a growing season and a harvesting season having final stages comprising;
   a. introducing nitrogen to the soil of the crop at the beginning of the growing season;
   b. determining the nitrogen depletion measurements in the leaves of the sugarcane crop prior to harvesting, wherein the determination is correlated to a SPAD chlorophyll meter reading;
   c. applying an effective amount of a ripener to the leaves of the sugarcane crop, based on the specific nitrogen depletion measurements, wherein no ripener is applied when a SPAD reading greater than about 45 is obtained, wherein ripener is applied to the sugarcane crop at a rate of about 6 ounces/acre to about 7 ounces/acre when a SPAD reading between about 44 and about 45 is obtained, wherein ripener is applied to the sugarcane crop at a rate of about 5.3 ounces/acre to about 5.7 ounces/acre when a SPAD reading between about 40 and about 43 is obtained, wherein ripener is applied to the sugarcane crop at a rate of about 4.8 ounces/acre to about 5.2 ounces/acre when a SPAD reading between about 37 to about 39 is obtained, wherein ripener is applied to the sugarcane crop at a rate of about 4.0 ounces/acre to about 4.5 ounces/acre when a SPAD reading of less than about 37 is obtained.

2. The method according to claim 1, wherein the time between growing season and the final stages of the harvesting season of the sugarcane crop is about six to eight months.

3. The method according to claim 1, wherein the ripener comprises glyphosate compound.

4. The method according to claim 2, wherein the nitrogen depletion measurements in the leaves of the sugarcane crop are determined beginning from approximately the middle of the growing season to the end of the harvesting season.

5. The method according to claim 1, wherein the nitrogen depletion measurements in the leaves of the sugarcane crop are determined by a method selected from the group consisting of aerial imagery, tissue samples, sap readings, infrared imagery and satellite imagery, whereby the determinations obtained from any one the methods can be correlated to a SPAD chlorophyll meter reading.

6. The method according to claim 1, wherein the nitrogen depletion measurements in the leaves of the sugarcane crop are determined using a SPAD chlorophyll meter.

7. A method for increasing the yield of sugar from a sugarcane crop, during a period of time including a growing season and a harvesting season having final stages, comprising:

(a.) determining the nitrogen depletion measurements in the leaves of the sugarcane crop prior to harvesting, wherein the determination is correlated to a SPAD chlorophyll meter reading;

(b) applying an effective amount of a ripener to the leaves of the sugarcane crop, based on the specific nitrogen depletion measurements, wherein no ripener is applied when a SPAD reading greater than about 45 is obtained, wherein ripener is applied to the sugarcane crop at a rate of about 6 ounces/acre to about 7 ounces/acre when a SPAD reading between about 44 and about 45 is obtained, wherein ripener is applied to the sugarcane crop at a rate of about 5.3 ounces/acre to about 5.7 ounces/acre when a SPAD reading between about 40 and about 43 is obtained, wherein ripener is applied to the sugarcane crop at a rate of about 4.8 ounces/acre to about 5.2 ounces/acre when a SPAD reading between about 37 to about 39 is obtained, wherein ripener is applied to the sugarcane crop at a rate of about 4.0 ounces/acre to about 4.5 ounces/acre when a SPAD reading of less than about 37 is obtained.

8. The method according to claim 7, wherein the time between growing season and the final stages of the harvesting season of the sugarcane crop is about six to eight months, and wherein the nitrogen depletion measurements in the leaves of the sugarcane crop are determined beginning from approximately the middle of the growing season to the end of the harvesting season.

9. The method according to claim 7, wherein the ripener comprises glyphosate compound.

10. The method according to claim 7, wherein the nitrogen depletion measurements in the leaves of the sugarcane crop are determined by a method selected from the group consisting of aerial imagery, tissue samples, sap readings, infrared imagery and satellite imagery, whereby the measurements obtained from any one the methods can be correlated to a SPAD chlorophyll meter reading.

* * * * *